United States Patent [19]

Reuber

[11] 4,293,042
[45] Oct. 6, 1981

[54] PORTABLE OSCILLATING-RING HARROW

[76] Inventor: August M. Reuber, 2840 S. Railroad, Albany, Oreg. 97321

[21] Appl. No.: 113,817

[22] Filed: Jan. 21, 1980

[51] Int. Cl.³ .................... A01B 19/10; A01B 33/06
[52] U.S. Cl. ................................ 172/110; 172/54; 172/117; 172/456
[58] Field of Search ............... 172/110, 456, 311, 46, 172/117, 54, 54.5

[56] References Cited

U.S. PATENT DOCUMENTS

| | | | |
|---|---|---|---|
| 1,535,058 | 4/1925 | Taylor | 172/456 |
| 3,354,966 | 11/1967 | Jackson | 172/456 X |
| 3,362,483 | 1/1968 | Twidale | 172/311 |
| 3,700,036 | 10/1972 | Reuber | 172/110 X |

Primary Examiner—Paul E. Shapiro
Attorney, Agent, or Firm—Kolisch, Hartwell & Dickinson

[57] ABSTRACT

An oscillating harrow having a pair of harrow rings which can be raised and folded easily for transport. Each ring includes a pair of opposed, central segments which are disposed below a ground-travelling frame, and a pair of opposed side segments which are mounted on the central segments for swinging between positions extending laterally and upwardly with respect to the frame. A pair of wing members attached to opposed sides of the frame, adjacent opposed side segments, are shiftable between operative and transport positions. The wing members are coupled to associated side segments through cables which are slack when the members are in their operative positions. As the wing members are swung from their operative to their transport positions, slack in the cables is taken up, causing the side segments to be drawn toward the associated wing members. The side segments are shifted thereby from their lowered, laterally extending positions toward raised, upwardly extending positions, and the two central segments are shifted upwardly away from the ground and toward the lower surface of the frame.

4 Claims, 5 Drawing Figures

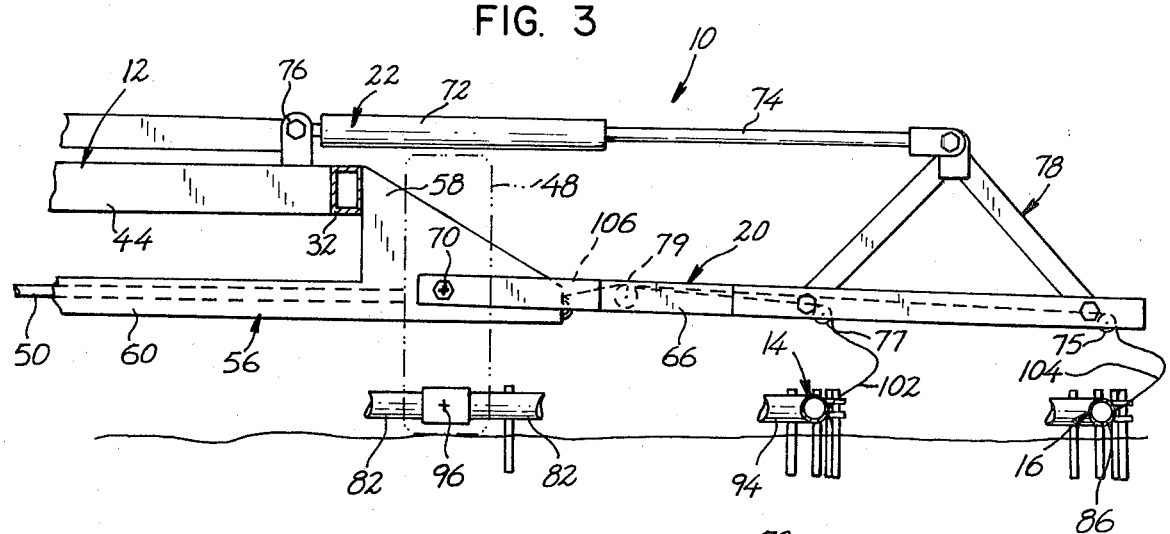
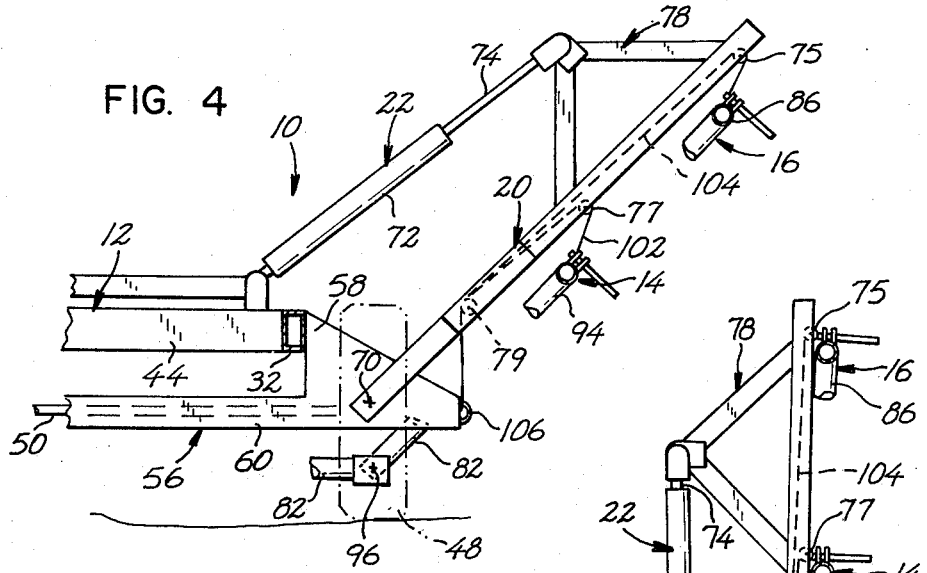
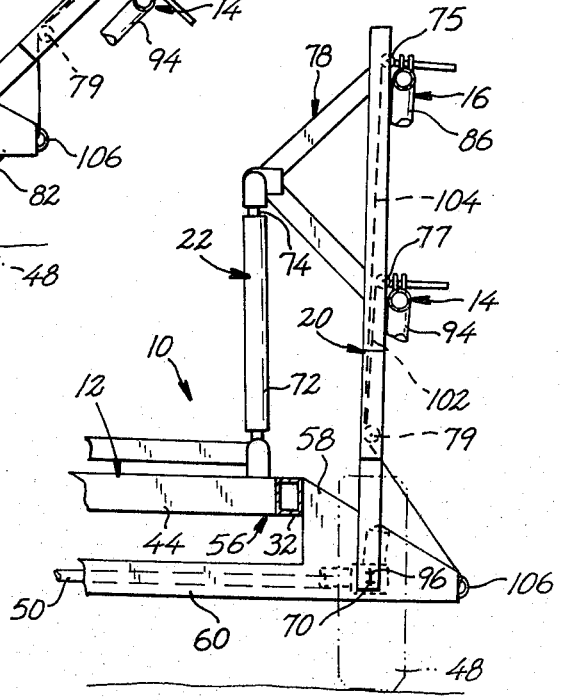

PORTABLE OSCILLATING-RING HARROW

BACKGROUND AND SUMMARY

This invention relates to oscillating-ring harrows, and in particular to such wherein the harrow rings are raisable and foldable for transport.

In my U.S. Pat. No. 3,700,036, issued Oct. 24, 1972, I disclose an oscillating-ring harrow having a pair of concentric rings with depending harrow points. The harrow rings are oscillatable in counterrotative directions to provide, with the harrow points extending into the ground, a ground-working action. For transport, the two harrow rings may be shifted manually between lowered, ground-working positions and raised transport positions. Further, the outer of the two rings may be shifted manually to a folded position.

A general object of the present invention is to provide, in an oscillating-ring harrow, a simple powered mechanism for shifting a harrow ring between a lowered, planar position and a raised, folded position.

More specifically, it is an object of the invention to provide, in a harrow having a pair of concentric harrow rings, powered mechanism for simultaneously shifting both rings between such positions.

It is another object of the present invention to provide, in an oscillating-ring harrow having a pair of concentric rings, powered mechanism for oscillatably driving the two rings counterrotatively.

The invention includes an elongate frame, and a pair of concentric harrow rings disposed below the frame for shifting between lowered, substantially planar positions and raised, folded positions. Each ring includes a pair of opposed central segments disposed below, and adjacent opposed end regions of the frame, and a pair of side segments which are pivotally attached to associated central segments for swinging between positions extending laterally of and upwardly relative to the frame. A pair of wing members mounted on opposed sides of the frame are shiftable, under the control of powered rams, between operative and transport positions. The wing members are coupled to associated side segments by cables which are slack when the members are in their operative positions. As the wing members are swung from their operative toward their transport positions, slack in the cables is taken up, causing the side segments to be drawn toward the associated wing members. The side segments are shifted thereby from their lowered, laterally extending positions, toward their raised, upwardly extending ones, and the two central segments are raised toward the lower surface of the frame.

These and other objects and features of the present invention will become more fully apparent when read in connection with the following detailed description of a preferred embodiment of the invention, and the accompanying drawings, wherein:

FIG. 3 is an enlarged sectional view taken generally along broken line 3—3 in FIG. 1, with the harrow rings shown in lowered, planar positions;

FIG. 4 is a view similar to FIG. 3, but showing the harrow somewhat simplified and in reduced scale, in a configuration wherein the harrow rings have been moved about midway between their lowered, planar and raised, folded positions; and FIG. 5 is a view similar to FIG. 4, showing the configuration of the harrow when the rings have been moved to their fully raised and folded positions.

DETAILED DESCRIPTION OF A PREFERRED EMBODIMENT OF THE INVENTION

Figure 1:
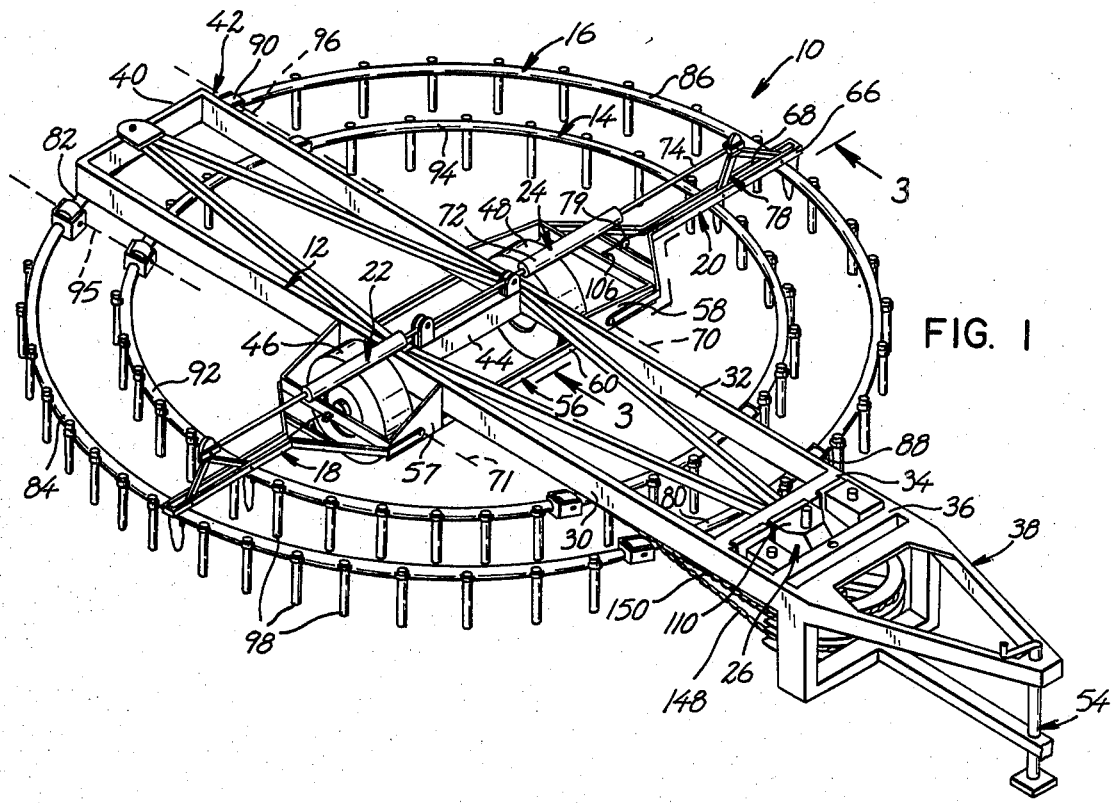
FIG. 1 is a perspective view of an oscillating-ring harrow constructed according to an embodiment of the present invention.

Looking first at FIG. 1, there is shown at 10 an oscillating-ring harrow constructed according to an embodiment of the present invention. The harrow is also referred to herebelow as ground-working apparatus. Harrow 10 generally includes an elongate frame 12 and a pair of concentric harrow rings 14, 16, which are disposed below, and extend to the sides of the frame. A pair of elongate wing members 18, 20 are mounted on opposed sides of frame 12 for shifting, under the control of powered rams 22, 24, respectively, between lowered, operative positions (FIGS. 1 and 3) and raised, transport positions (FIG. 5). As will be detailed below, shifting of members 18, 20 between their operative and transport positions shifts the two rings between lowered, planar positions (shown in FIG. 1) and raised, folded positions (FIG. 5). Also disclosed herein is a powered unit 26 (FIGS. 1 and 2) used in driving rings 14, 16 oscillatably, in counterrotative directions, when the rings are in their lowered, planar positions.

With continued reference to FIG. 1, frame 12 includes a pair of laterally spaced, elongate frame members 30, 32 which are joined by cross bars 34, 36 adjacent the frame's forward end region 38, cross bar 40 adjacent the frame's trailing end region 42, and cross bar 44 intermediate the two end regions. Frame 12 is carried on a pair of laterally spaced wheels, shown at 46, 48, for movement across a ground surface. As can be appreciated with reference to FIGS. 3–5, the just-mentioned wheels are rotatably mounted on an axle 50 attached to frame 12, adjacent cross bar 44. Frame 12 additionally includes a conventional tractor hitch 54 (FIG. 1) by which the harrow can be attached to, and pulled by a tractor.

Frame 12 carries, adjacent cross bar 44, a subframe 56 by which members 18,20 are pivotally mounted on the frame. Subframe 56 includes a pair of laterally spaced wheel baskets 57, 58, which are attached, as by welding, to members 30, 32, respectively, and which are joined, one to the other, by a pair of longitudinally spaced bars, such as bar 60 seen in FIGS. 1 and 3–5.

Each wing member is formed of a pair of bars, such as bars 66, 68 forming member 20 (FIG. 1), these bars being fashioned adjacent their inwardly facing ends to form a yoke which is dimensioned to embrace the associated basket, as shown. The bars forming wing members 18,20 are pivotally attached, at their inwardly facing ends, to associated baskets, for pivoting about axes 70 (FIGS. 1 and 3–5) and 71 (FIG. 1), respectively, these axes being parallel to the frame's longitudinal axis. Rotatably mounted on each member, at spaced positions therealong, are single pulleys, such as pulleys 75, 77 on member 20 (FIGS. 3–5) and twin pulleys, such as twin pulleys 79 on the same member. The pulleys, which rotate about axes normal to the plane of FIGS. 3–5, are also referred to herebelow as pulley means.

Rams 22, 24 each include a cylinder 72 and a reciprocable piston 74, (FIGS. 3–5). The cylinder of each ram is pivotally mounted on a bracket, such as bracket 76 seen in FIG. 3 carried on cross bar 44. The piston end of the ram is attached adjacent the outer end portion of the associated extension member by an inverted V-shaped brace, such as brace 78 associated with member 20. The two arms of brace 78 are secured between the two bars forming member 20, and the vertex of the brace is pivotally attached to the piston end of ram 20, as shown.

Rams 22, 24 are actuated by hydraulic fluid supplied from a tractor used in pulling the harrow. The hydraulic fluid hose connections to the two rams, which are not shown, are conventional. Each ram is shiftable between an extended position, shown in FIG. 3, and a retracted position, shown in FIG. 5. As a ram is shifted between its extended and retracted positions, its associated wing member is shifted between a lowered, operative position (FIG. 3), and a raised, transport position (FIG. 5).

The construction of rings 14,16 will be described with reference to ring 16 only, the two rings being similar except in radial dimension. Looking at FIG. 1, ring 16 includes a central portion comprising a pair of opposed central segments 80, 82 which are disposed below frame end regions 38, 42, respectively, and a pair of opposed side segments 84, 86 which extend from the near (left) and far (right) sides of frame 12 in FIG. 1. Each side segment of ring 16 is attached at its opposed ends, to associated ends of segments 80, 82, for swinging relative thereto between a lateral position extending laterally of the frame (FIGS. 1 and 3), and an upward position extending upwardly relative to the frame (FIG. 5). The ring attachments of side segment 86 to central segments 80, 82 are shown in FIG. 1 at 88, 90, respectively, and are described in detail in my U.S. Pat. No. 3,700,036. Segments 84, 86 and associated side segments 92, 94 of ring 14 pivot about spaced axes, indicated by dashed lines 95, 96, respectively, in FIG. 1, paralleling the frames' longitudinal axis.

A plurality of angularly spaced, downwardly extending points, or tines, 98 are secured to the two rings 14, 16, also as detailed in the above-mentioned U.S. patent.

Referring to FIGS. 3-5, each of the side segments of rings 14, 16 such as segments 94, 86, respectively, are coupled to the associated wing member, such as member 20, by cables, such as cables 102, 104, respectively. Cable 102 is attached at one of its ends to segment 94, where the same lies below member 20, and at its other end to a cable hook 106 attached to basket 58, as shown (see FIG. 1). Similarly, cable 104 is attached at one of its ends to segment 86 and at its other end to cable hook 106. Cables 102, 104 are trained, individually, over pulleys 77, 75, respectively, and collectively over pulleys 79. As seen in FIG. 3, when assembly 20 is in its lowered, operative position, cables 102, 104 are slack, as indicated by the somewhat looped portion of the cables between pulleys 77, 75 and segments 94, 86, respectively. Such permits rings 14, 16, in their lowered, planar positions, to oscillate relative to member 20.

Looking now at FIG. 4, as wing member 20 is shifted toward its raised, transport position, the distance between hook 106 and pulleys 79 increases, producing, in effect, a pulling-in of cables 102, 104 between pulleys 79 and the points of cable attachment to the associated side segments. This causes side segments 94, 86 to raise upwardly and inwardly, toward frame 12. Ultimately, when member 20 is shifted fully to its transport position (FIG. 5), the just-described interactions are effective to draw associated segments 94, 86, tightly against member 20. Likewise, as member 20 is shifted from its transport to its operative position, the portion of cables 102, 104 between pulleys 79 and associated pulleys 77, 75 is payed out produce the cable slack described with reference to FIG. 3. Member 18 is similarly coupled, by a pair of cables to the opposed side segments of rings 14, 16. Cables, such as cables 102, 104 and pulleys, such as pulleys 75, 77 and 79, are also referred to herebelow as means operatively connecting a wing member to an associated side segment for drawing the two together as the wing member is shifted from its operative toward its transport position. The rams 22, 24 and wing members constitute shifting means interconnecting the frame and the side segments for shifting the side segment between laterally outwardly extending positions and upwardly extending positions.

Figure 2:
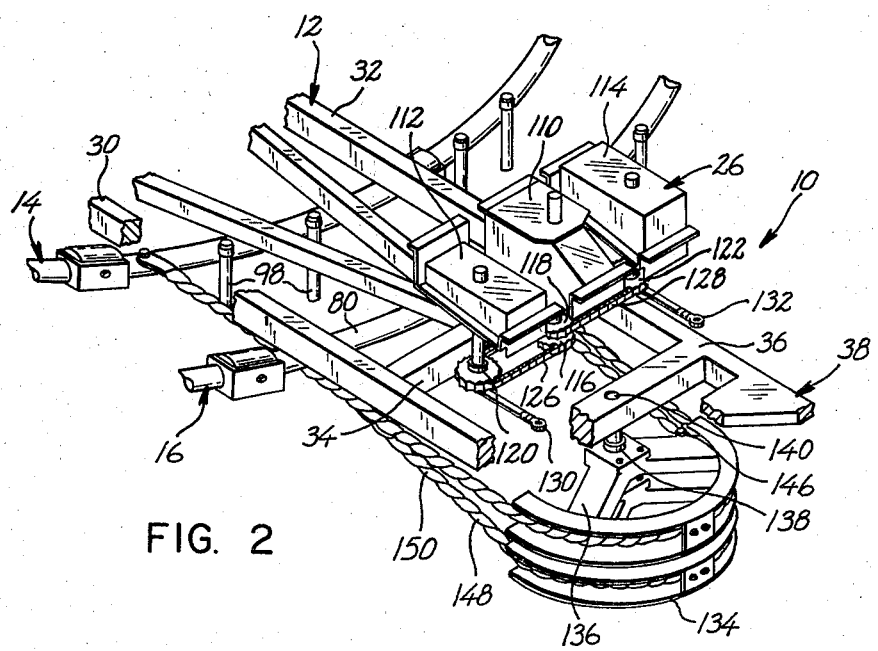
FIG. 2 is an exploded, enlarged view of a powered unit used in oscillatably driving the harrow rings.

Looking now at FIG. 2, hydraulic assembly 26, which is shown here disassembled from frame 12, includes a hydraulic motor 110 and a pair of sprocket cannisters 112, 114, attached to opposite sides thereof. Motor 110, which is of conventional construction, is powered hydraulically, using the hydraulic system of a towing tractor. The hydraulic hose connections for motor 110 are not shown. The output shaft of motor 110 carries a pair of sprockets 116, 118 for rotation therewith about the vertically disposed shaft axis. Cannisters 112, 114 provide rotating shafts having sprockets 120, 122, respectively, which rotate therewith about vertical axes. Motor sprockets 116, 118, are rotatably coupled to cannister sprockets 120, 122, respectively, by chains 126, 128, respectively. Pivotally mounted on sprocket 120, 122, at the lower sides thereof in FIG. 2, are crank arms 130, 132, respectively, which function in a manner to be described.

Unit 26 further includes a pair of half wheels 134, 136 which are mounted for independent rotation about a vertical shaft 138. The latter is carried within a suitable opening 140 located centrally in frame cross bar 36. With motor 110 and cannisters 112, 114 mounted between frame across bars 34, 36, as shown in FIG. 1, and half wheels 134, 136 rotatably mounted on cross bar 36, crank arms 130, 132 are pivotally connected to wheels 134, 136, respectively. More particularly, the free end of arm 132 is pivotally attached to half wheel 136, at the hinge connection indicated at 146, and the free end of arm 130 is pivotally attached to wheel 134 at a hinge connection substantially diameterically opposed to connection 146. The two crank arms thus act to produce oscillatory movement of wheels 134, 136 about shaft 138, as sprockets 120, 122, respectively, rotate. Chains 126, 128 are set such that wheels 134, 136 oscillate 180° out of phase with one another, i.e., the wheels oscillate counterrotatively.

A pair of cables 148, 150 are carried within circumferential grooves within wheels 134, 136, respectively, and attached thereto, as by clamping, for oscillation therewith. Cable 148 is attached, at its opposite ends, to opposed end regions of segment 80 and cable 150 is attached, at is opposite ends, to opposed end regions of the forward central segment of ring 14. It can be appreciated that wheels 134, 136, when oscillating as just described, produce counterrotative oscillation of the two harrow rings.

In its intended use, harrow 10 is towed by a tractor or the like across a field to be cultivated, with rings 14, 16, in their lowered planar positions, wherein the ring tines project into the ground, as indicated in FIG. 3. As the harrow is pulled across the field, motor 110 causes rings 14, 16 to oscillate counterrotatively, as has been described, wherein the torque produced by one ring is opposed continually by the torque produced by the other ring.

When the harrow is to be transported, rams 22, 24 are actuated simultaneously to shift from their extended toward their retracted positions. This shifts members 18, 20 toward their transport positions, causing the associated side segments of rings 14, 16 to be lifted toward the associated wing members, as has been described. Simultaneously, the central segments therebetween shift from lowered, ground-working positions to raised positions.

Thus it can be seen that rams 22, 24, cooperating with members 18, 20, respectively, shift the same between operative and transport positions. The cables coupling the two members to associated side segments of ring 14, 16, provide means for lifting the pairs of side segments between their lowered, lateral positions and their raised upward positions. Concurrently, such lifting produces movement of the attached central segments between their lowered and raised positions.

From the foregoing, it can be appreciated how various objects and features of the present invention are met. In particular, the harrow construction described herein is designed to provide simultaneous shifting of one or more harrow rings between lowered planar, and raised folded positions, with such shifting being accomplished by hydraulic rams. Secondly, the ring drive system described herein permits the two harrow rings to be oscillated at a desired speed and phased relationship.

While a particular embodiment of a portable harrow has been described herein, it is obvious that various changes and modifications may be made without departing from the spirit of the inventin.

It is claimed and desired to secure by Letters Patent:

1. Ground-working apparatus comprising:
   a frame adapted for movement over a ground surface,
   a central ground-working segment disposed beneath said frame and shiftable vertically between a lowered, ground-working position and a raised position spaced above the ground surface,
   a pair of opposed ground-working side segments pivotally mounted on opposed sides of said central segment for pivoting relative to said central segment between laterally extending positions wherein the side segments extend laterally of said frame and upwardly extending positions, wherein said side segments extend substantially upwardly relative to said frame, and
   shifting means operatively connecting said side segments to said frame for shifting the former between their laterally extending positions and their upwardly extending positions, with such shifting producing movement of said central segment between its lowered and raised positions
   said shifting means comprising a pair of wing members pivotally mounted on opposed sides of said frame for pivotal movement between operative positions extending substantially laterally of said frame and transport positions extending substantially upwardly relative to said frame, one wing member being disposed above and associated with one side segment and the other wing member being disposed above and associated with the other side segment, operator means operatively connecting said frame and said wing members for shifting the wing members between their operative and transport positions, and connecting means operatively coupling each wing member to its associated side segment whereby the side segment is drawn toward its associated wing member upon the wing member being shifted from its operative to its transport position.

2. The apparatus of claim 1, wherein said connecting means comprises a cable attached at one end to said frame and at an opposite end to the side segment, and pulley means on the wing member training the cable between its ends, the apparatus being so constructed that the distance between said pulley means and the attachment of the cable to said frame increases as the wing member is shifted from its operative toward its transport position.

3. An oscillating-ring harrow comprising:
   an elongate frame and means on the frame for supporting the frame for movement over the ground,
   a harrow ring disposed under and spaced below said frame having a plurality of spaced downwardly projecting tines secured thereto, said ring being mounted for oscillatory movement relative to said frame,
   oscillating means interposed between the frame and said ring for producing such oscillatory movement,
   said ring including a central portion disposed directly under said frame and a pair of opposed side segments pivotally connected to opposite sides of said central portion for swinging movement between laterally outwardly extending positions and upwardly extending positions,
   a pair of wing members pivotally mounted on opposed sides of said frame for pivotal movement between operative positions extending substantially laterally of said frame and transport positions extending substantially upwardly relative to said frame, one wing member being spaced above and associated with one side segment and the other wing member being spaced above and associated with the other side segment,
   power-operated means operatively connecting said frame and said wing members for shifting the wing members between their operative and transport positions, and
   means coupling each wing member to its associated side segment whereby the side segment swings from its laterally outwardly extending position to its upwardly extending position and is drawn toward the wing member upon the wing member being shifted from its operative to its transport position.

4. The oscillating-ring harrow of claim 3, wherein the means coupling the wing member and side segment comprises cable means extending from the side segment to the wing member which is in a relaxed state with the wing member in its operative position extending laterally of the frame and which is tensed to draw the side segment toward the wing member with the wing member shifted to its transport position.

* * * * *